(12) United States Patent
Pyo et al.

(10) Patent No.: US 8,234,118 B2
(45) Date of Patent: Jul. 31, 2012

(54) METHOD AND APPARATUS FOR GENERATING DIALOG PROSODY STRUCTURE, AND SPEECH SYNTHESIS METHOD AND SYSTEM EMPLOYING THE SAME

(75) Inventors: Kyoungnan Pyo, Suwon-si (KR); Jaewon Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1015 days.

(21) Appl. No.: 11/132,195

(22) Filed: May 19, 2005

(65) Prior Publication Data
US 2005/0261905 A1    Nov. 24, 2005

(30) Foreign Application Priority Data
May 21, 2004    (KR) .................. 10-2004-0036389

(51) Int. Cl.
| G10L 13/08 | (2006.01) |
| G10L 15/04 | (2006.01) |
| G10L 15/28 | (2006.01) |
| G10L 13/06 | (2006.01) |
| G10L 15/06 | (2006.01) |
| G10L 15/00 | (2006.01) |
| G10L 19/00 | (2006.01) |
| G10L 21/00 | (2006.01) |
| G06F 17/20 | (2006.01) |
| G06F 17/28 | (2006.01) |
| G06F 17/27 | (2006.01) |
| G06F 17/21 | (2006.01) |

(52) U.S. Cl. ........ 704/260; 704/251; 704/252; 704/255; 704/261; 704/243; 704/231; 704/219; 704/275; 704/270; 704/270.1; 704/1; 704/4; 704/9; 704/10

(58) Field of Classification Search .................. 704/258, 704/260, 268, 257, 231, 253, 215, 267, 251, 704/252, 255, 261, 243, 219, 275, 270, 270.1, 704/4, 9, 10
See application file for complete search history.

(56) References Cited

U.S. PATENT DOCUMENTS
5,457,768 A * 10/1995 Tsuboi et al. .................. 704/231
(Continued)

FOREIGN PATENT DOCUMENTS
JP    07-134713    5/1995

OTHER PUBLICATIONS

Shriberg, Elizabeth et al., "Can Prosody Aid the Automatic Classification of Dialog Acts in Conversational Speech," Language and Speech 41 (3-4): 439-487. Special Issue on Prosody and Conversation, 1998.*

(Continued)

Primary Examiner — Douglas Godbold
Assistant Examiner — Edgar Guerra-Erazo
(74) Attorney, Agent, or Firm — Staas & Halsey LLP

(57) ABSTRACT

A dialog prosody structure generating method and apparatus, and a speech synthesis method and system employing the dialog prosody structure generation method and apparatus, are provided. The speech synthesis method using the dialog prosody structure generation method includes: determining a system speaking style based on a user utterance; if the system speaking style is dialog speech, generating dialog prosody information by reflecting discourse information between a user and a system; and synthesizing a system utterance based on the generated dialog prosody information.

25 Claims, 6 Drawing Sheets

U.S. PATENT DOCUMENTS

| | | | |
|---|---|---|---|
| 5,636,325 A * | 6/1997 | Farrett | 704/258 |
| 5,832,435 A * | 11/1998 | Silverman | 704/260 |
| 5,890,117 A * | 3/1999 | Silverman | 704/260 |
| 6,401,061 B1 * | 6/2002 | Zieman | 704/10 |
| 7,096,183 B2 * | 8/2006 | Junqua | 704/258 |
| 7,542,903 B2 * | 6/2009 | Azara et al. | 704/257 |
| 7,552,055 B2 * | 6/2009 | Lecoeuche | 704/270.1 |
| 7,877,257 B2 * | 1/2011 | Schmidt et al. | 704/257 |
| 2002/0120451 A1 * | 8/2002 | Kato et al. | 704/258 |
| 2003/0078780 A1 * | 4/2003 | Kochanski et al. | 704/258 |
| 2005/0086592 A1 * | 4/2005 | Polanyi et al. | 715/512 |
| 2005/0088981 A1 * | 4/2005 | Woodruff et al. | 370/260 |
| 2005/0094798 A1 * | 5/2005 | Yacoub | 379/265.12 |
| 2005/0286705 A1 * | 12/2005 | Contolini et al. | 379/265.02 |
| 2006/0122834 A1 * | 6/2006 | Bennett | 704/256 |
| 2006/0129403 A1 * | 6/2006 | Liao et al. | 704/260 |
| 2007/0010990 A1 * | 1/2007 | Woo | 704/4 |
| 2010/0161317 A1 * | 6/2010 | Au | 704/9 |

OTHER PUBLICATIONS

Yang, Li-Chiung. "Visualizing Spoken Discourse: Prosodic Form and Discourse Functions of Interruption," Sep. 2001, Procs. of the Second SIGdial Workshop on Discourse and Dialogue vol. 16.*

Jurafsky, D. et al., "Automatic Detection of Discourse Structure for Speech Recognition and Understanding," Dec. 1997, IEEE Procs. of 1997 Workshop on Automatic Speech Recognition and Understanding, pp. 88-95.*

Hastie, H. W., Poesio, M. & Isard, S. (2002) Automatically predicting dialogue structure using prosodic features. Speech Communication 36:63-79.*

Jurafsky, D.; Bates, R.; Coccaro, N.; Martin, R.; Meteer, M.; Ries, K.; Shriberg, E.; Stolcke, A.; Taylor, P.; Van Ess-Dykema, C.; , "Automatic detection of discourse structure for speech recognition and understanding," Automatic Speech Recognition and Understanding, 1997. Proceedings., 1997 IEEE Workshop on , vol., no., pp. 88-95, Dec. 14-17, 1997.*

Zue, Victor W., et al., "Conversational Interfaces: Advances and Challenges", Proceedings of the IEEE, vol. 88, No. 8, 2000, pp. 1166-1180.*

Jurafsky, D."Bates, R.; Coccaro, N.; Martin, R.; Meteer, M.; Ries, K.; Shriberg, E.; Stolcke, A.; Taylor, P." Van Ess-Dykema, C.;, "Automatic detection of discourse structure for speech recognition and understanding," Automatic Speech Recognition and Understanding, 1997. Proceedings., 1997 IEEE Workshop on, vol., no., pp. 88-95, Dec. 14-17, 1997.*

* cited by examiner

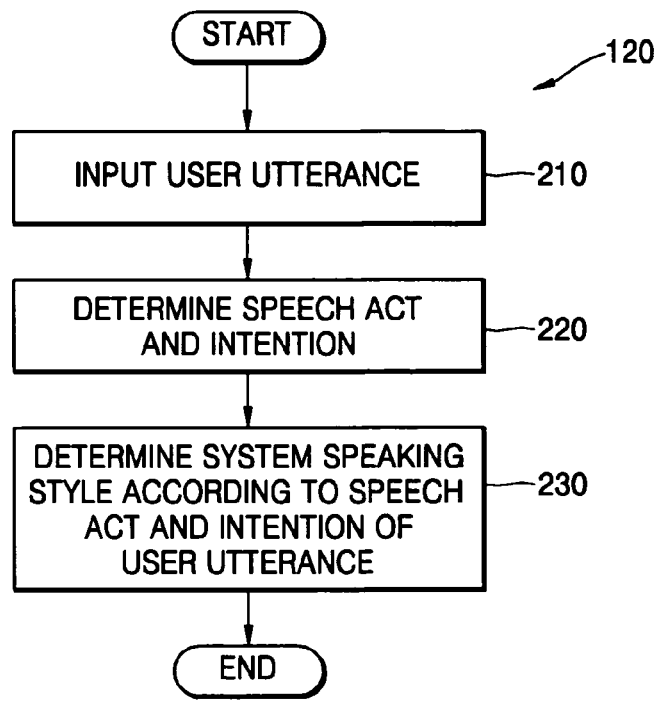
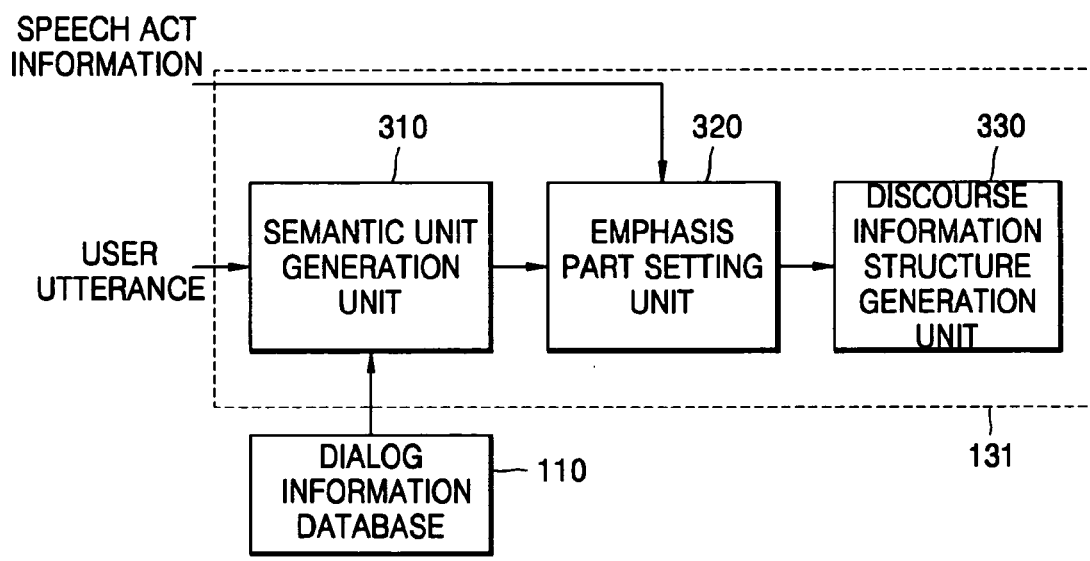

METHOD AND APPARATUS FOR GENERATING DIALOG PROSODY STRUCTURE, AND SPEECH SYNTHESIS METHOD AND SYSTEM EMPLOYING THE SAME

CROSS-REFERENCE TO RELATED APPLICATION

This application claims the priority of Korean Patent Application No. 10-2004-0036389, filed on May 21, 2004, in the Korean Intellectual Property Office, the disclosure of which is incorporated herein by reference.

BACKGROUND OF THE INVENTION

1. Field of the Invention

The present invention relates to speech synthesis, and more particularly, to a method and apparatus for generating a dialog prosody structure capable of expressing the focus of a dialog or the intention of a speaker by using information obtained through discourse analysis between user utterances and system utterances, and a speech synthesis method and system employing the method and apparatus.

2. Description of Related Art

A speech synthesizer is a text-to-speech (TTS) conversion apparatus that converts a character string, i.e., a sentence, into speech, and is used in a variety of platforms such as a personal computer (PC), a personal digital assistant (PDA), and a mobile phone. Speech synthesizers are applied in a variety of fields, including communications, such as in a unified messaging system (UMS) which reads email and character messages, and information retrieval, such as in speech browsing which outputs a web document, a database (DB) search result, and a system message in the form of speech.

The speech synthesizer generally performs three steps: language processing, prosody generation, and synthesized speech generation. Among these steps, prosody generation means generation of information on an utterance phase, a silent interval, a segmental duration, a segmental amplitude, a pitch pattern, and the like, in relation to an input sentence. Here, the prosody includes intonation, rhythm, accent, etc., and is a characteristic of speech that expresses meaning, emphasis, emotion, etc., without changing the unique characteristics of phonemes. Speech without at least a simple prosody cannot convey meaning exactly and moreover is dull to listen to.

Among methods tried so far in order to generate more natural prosodies, methods disclosed in U.S. Patent Publication Nos. 20030163314 and 20030078780, and Japanese Laid-Open Patent Publication Nos. 1995-199981 and 2002-031198 are noteworthy. In U.S. Patent Publication No. 20030163314, the theme of a document is determined according to semantic information, and one speaking style is selected from a group of predefined speaking styles corresponding to themes and is used to reflect a prosody. In U.S. Patent Publication No. 20030078780, a prosody characteristic is selected from among prosody characteristics shown in spoken dialog to express the characteristic of a prosody which appears repeatedly in a predetermined part or in the speaking style. In Japanese Patent Publication No. 1995-199981, considering speed or emphasis in a speech, it is determined whether an accented part of a compound word is separated or unified, in order to improve naturalness and clarity of synthesized speech. In Japanese Patent Publication No. 2002-031198, syntactic interpretation information is obtained not in units of polymorphemes but in units of accent phrases, and prosody information is set.

However, according to the above methods, a prosody structure is set by using only information in a sentence based on syntactic analysis or semantic analysis and, as a result, sentences with identical structures always have prosody structures formed with identical intonation or emphasis. Accordingly, it is difficult to express the focus of a dialog or the intention of a speaker by the prosody structure, and there is a limit to generating natural-sounding synthesized speech.

BRIEF SUMMARY

An aspect of the present invention provides a dialog prosody structure generation method and apparatus for generating a prosody augmented by discourse information between a user and a system.

Another aspect of present invention provides a speech synthesis method and system for generating synthesized speech by adding a prosody augmented by discourse information between a user and a system.

According to an aspect of the present invention, there is provided a dialog prosody structure generating method employed in a speech synthesizer, the method including: generating discourse information based on a speech act of a user utterance for a semantic structure of a system utterance corresponding to the user utterance; generating prosody information including an utterance boundary level for the discourse information of the semantic structure; and generating an intonation pattern for the semantic structure of the system utterance based on the prosody information.

The method may further include: when the semantic structure of a current system utterance is identical to that of a previous system utterance, adjusting an emphasis tag on repeated information.

According to another aspect of the present invention, there is provided a dialog prosody structure generating apparatus employed in a speech synthesizer, the apparatus including: a dialog information database which manages an entire dialog between a user and a system, and stores information and a dialog history required to proceed with the dialog based on a speech act and intention; a discourse information generation unit which generates a semantic unit of a system utterance corresponding to a user utterance by referring to the dialog information database, and generates discourse information for each semantic unit based on a speech act of the user utterance; a prosody information generation unit which generates prosody information including an utterance boundary level, for the discourse information of each semantic unit; and an intonation pattern generation unit which generates an intonation pattern for each semantic unit based on the prosody information.

The apparatus may further include: a repeated information application unit which adjusts an emphasis tag on repeated information when the semantic structure of a current system utterance is identical to that of a previous system utterance, by referring to the dialog information database.

According to still another aspect of the present invention, there is provided a speech synthesis method including: determining a system speaking style based on a user utterance; when the system speaking style is dialog speech, generating dialog prosody information by reflecting discourse information between a user and a system; and synthesizing a system utterance based on the generated dialog prosody information.

The method may further include: if the system speaking style is read speech, synthesizing a system utterance based on prosody information generated according to a rule.

According to still another aspect of the present invention, there is provided a speech synthesis system including: a dialog information database which manages an entire dialog between a user and a system, and stores information and a dialog history required to proceed with the dialog based on a speech act and intention; a system speaking style determination unit which determines a system speaking style based on a user utterance by referring to the dialog information database; a dialog prosody generation unit which, when a system speaking style is dialog speech, generates dialog prosody information reflecting discourse information between a user and the system by referring to the dialog information database; and a synthesis unit which synthesizes a system utterance based on the generated dialog prosody information.

According to another aspect of the present invention, there is provided a prosody structure generation apparatus including: a dialog information database which manages an entire dialog between a user and a system, and stores information and a dialog history required for the dialog to proceed based on a speech acts and intention; a system speaking style determination unit which determines a speech act and intention by analyzing a user utterance obtained through a speech recognition process with reference to the dialog information database, and determines the system speaking style as either read speech or dialog speech according to the determined speech act and intention associated with the user utterance; and a dialog prosody generation unit including a discourse information generation unit, a prosody information generation unit, and an intonation pattern generation unit. The discourse information generation unit receives a user utterance from the system speaking style determination unit and generates a discourse information structure in which a different emphasis part is set according to whether the speech act and included semantic unit of a system utterance corresponding to whether the user utterance is new information or old information. The prosody information generation unit receives discourse information structure from the discourse information generation unit, and a semantic structure, a sentence structure, and a morpheme structure of a system utterance, and generates prosody information in which an emphasis tag including an utterance boundary level, accent, and utterance duration is set on the basis of the types of semantic words, a closeness between polymorphemes, and a number of syllables that can be spoken at a time. The intonation pattern generation unit receives inputs of the semantic structure of a system utterance including prosody information, extracts a plurality of characteristics in each semantic unit and compares the plurality of characteristics with the characteristics of each semantic unit of an intonation pattern database with contents of characteristics of each semantic unit and their index, searches for a semantic unit having closest characteristics, and generates an intonation pattern according to a result of the search.

According to still another aspect of the present invention, there is provided computer-readable recording media having recorded thereon computer-readable programs for performing the above methods.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which:

FIG. 2 is a flowchart for explaining operation of the system speaking style determination unit shown in FIG. 1;

FIG. 3 is a detailed block diagram showing the discourse information generation unit shown in FIG. 1;

DETAILED DESCRIPTION OF EMBODIMENTS

Figure 1:
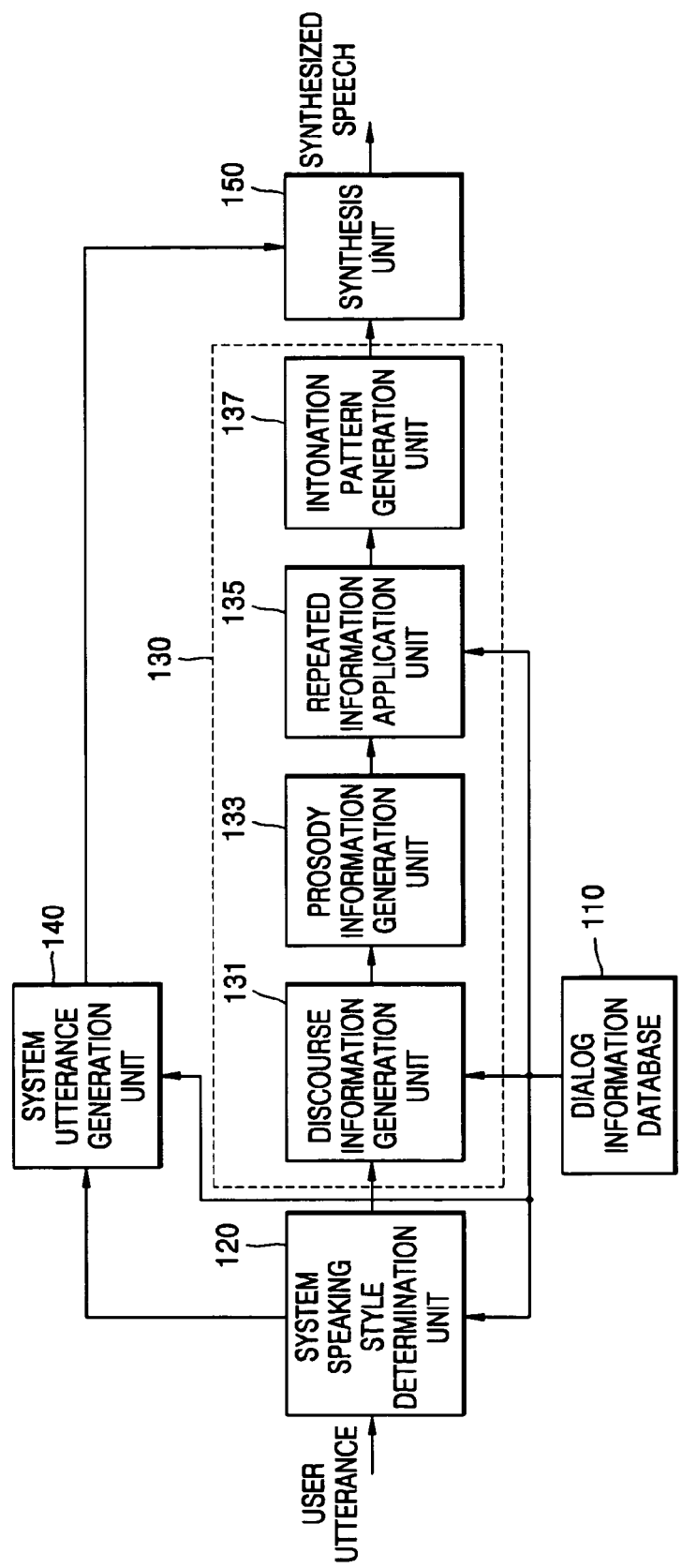
FIG. 1 is a block diagram showing the structure of a dialog prosody structure generation apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Referring to FIG. 1, a prosody structure generation apparatus according to an embodiment of the present invention includes a dialog information database 110, a system speaking style determination unit 120, a dialog prosody generation unit 130, a system utterance generation unit 140, and a synthesis unit 150. Here, the dialog prosody generation unit 130 includes a discourse information generation unit 131, a prosody information generation unit 133, a repeated information application unit 135, and an intonation pattern generation unit 137.

Referring to FIG. 1, the dialog information database 110 manages an entire dialog between a user and a system, and enables the dialog to proceed based on a speech acts and intention. For example, the dialog information database 110 expresses system utterances corresponding to user utterances that can be input, according to the speech act and intention, and stores the system utterances as elements of a database, and also stores a dialog history of the user utterances and the system utterances up to present. Also, even when speech acts or intentions are identical, a system speaking style can vary according to a domain to which a system utterance belongs. Accordingly, in order to more accurately determine a system speaking style, domain information can be further included. It is to be understood that the content of the database is not limited to the items described above and various information can be included depending on a desired accuracy or processing speed.

The system speaking style determination unit 120 determines a speech act and intention by analyzing a user utterance obtained through a speech recognition process with reference to the dialog information database 110, and according to the determined speech act and intention associated with the user utterance, determines the system speaking style as either read speech or dialog speech. At this time, the user utterance includes a recognized character string and reliability. The system speaking style determination unit 120 sets a criterion to determine a system speaking style, by determining the criterion statistically or experimentally in advance, corresponding to speech act and intention. If the system speaking style of the user utterance is determined as read speech by the system speaking style determination unit 120, the user utterance is provided to the system utterance generation unit through the system speaking style determination unit 120. And, if the system speaking style is determined as dialog speech, the user utterance is provided to the discourse information generation unit 130.

In the dialog prosody generation unit 130, the discourse information generation unit 131 receives an input of a user utterance provided by the system speaking style determination unit 120, and generates a discourse information structure in which a different emphasis part is set according to whether the speech act and included semantic unit of a system utterance corresponding to whether the user utterance is new information or old information.

The prosody information generation unit 133 receives inputs of discourse information structure provided by the discourse information generation unit 131, and the semantic structure, sentence structure, and morpheme structure of a system utterance, and generates prosody information in which an emphasis tag including an utterance boundary level, an accent, and an utterance duration is set on the basis of the types of semantic words, a closeness between polymorphemes, and the number of syllables that can be spoken at a time.

Referring to the dialog history stored in the dialog information database 110, the repeated information application unit 135 adds an extended pitch range to the emphasis tag or adjusts an already set accent or utterance duration, depending on whether a current system utterance has the same meaning as the previous system utterance, and provides finally generated prosody information to the intonation pattern generation unit 137. Here, the repeated information application unit 135 is an optional element that is included at the discretion of a user or the system.

The intonation pattern generation unit 137 receives inputs of the semantic structure of a system utterance including prosody information provided by the repeated information application unit 130. The intonation pattern generation unit 137 extracts a plurality of characteristics in each semantic unit and compares the plurality of characteristics with the characteristics of each semantic unit of an intonation pattern database with contents of characteristics of each semantic unit and their index, prepared in advance inside the intonation pattern generation unit 137. The intonation pattern generation unit 137 searches for a semantic unit having closest characteristics and generates an intonation pattern according to the setting of the index of the semantic unit. The intonation pattern generation unit 137 can be implemented by a variety of conventional methods.

If the system speaking style determination unit 120 determines the system speaking style to be read speech, the system utterance generation unit 140 generates a system utterance corresponding to a user utterance with reference to the dialog information database 110.

When a system utterance provided by the system utterance generation unit 140 is input, the synthesis unit 150 generates a prosody according to an prosody structure generation method embedded in the synthesis unit 150, and by reflecting the generated prosody, generates synthesized speech. Meanwhile, when a system utterance provided by the intonation pattern generation unit 137 is input, the synthesis unit 150 generates synthesized speech by reflecting the prosody structure finally generated by the intonation pattern generation unit 137.

FIG. 2 is a flowchart for explaining operation of the system speaking style determination unit 120 shown in FIG. 1.

Referring to FIG. 2, in operation 210, a user utterance obtained through a speech recognition process is input. In operation 220, the morpheme structure, semantic structure, and sentence structure of the user utterance are analyzed, and by referring to the dialog information database 110, a domain, a speech act, and intention are determined. Here, there are various speech acts, including greeting (greeting), information or inform (INFORM), confirmation or confirm (ASK_CONFIRM), answer (RESPONSE), wh-question (ASK_REF), yes-no question (ASK_IF), and request acting (REQ_ACT). Meanwhile, the types of intentions include speaking and reading.

In operation 230, a system speaking style is determined as any one of a read speech and a dialog speech according to the domain, speech act, and intention associated with the user utterance determined in operation 220. For example, if the speech act of the user utterance is wh-question (ASK_REF), the intention associated with the user utterance is "reading", and the domain corresponds to "news", the system speaking style is determined as read speech. Meanwhile, if the speech act of the user utterance are wh-question (ASK_REF), the intention associated with the user utterance is "speaking", and the domain corresponds to "weather", the system speaking style is determined as dialog speech.

FIG. 3 is a detailed block diagram showing the discourse information generation unit 131 shown in FIG. 1. The discourse information generation unit 130 includes a semantic unit generation unit 310, an emphasis part setting unit 320, and a discourse information structure generation unit 330.

Referring to FIGS. 1 and 3, the semantic unit generation unit 310 analyzes the semantic structure of a system utterance corresponding to the user utterance with reference to the dialog information database 110, and generates a semantic unit according to the result of the analysis.

The emphasis part setting unit 320 analyzes the sentence structure according to the analyzed semantic structure, selects a semantic unit to be emphasized, based on the speech act of the user utterance, and adds a first emphasis tag. Here, information on the speech act of the user utterance is generated in the system speaking style determination unit 120. For example, when the speech act is wh-question (ASK_REF), a part corresponding to new information that is not given in the user utterance, among semantic units generated in the semantic unit generation unit 310, is set as an emphasis part.

The discourse information generation unit 330 analyzes the morpheme structure of each semantic unit included in the analyzed sentence structure, and generates a discourse information structure by combining a semantic unit to which a first emphasis tag is added with the remaining semantic units.

The operation of the discourse information generation unit 130 shown in FIG. 3 will now be explained in more detail by taking as an example a user utterance, "Appaneun joomale eudi gashini? (Where is your father going this weekend?)" having a speech act corresponding to wh-question (ASK_REF).

The semantic structure of the user utterance, "Appaneun joomale eudi gashini? (Where is your father going this weekend?)", is analyzed as having semantic areas corresponding to a verb "gada (to go)", a subject "appa (father)", a time "joomal (weekend)", and a place "eudi (where)". If the dialog information database 110 is referred to in relation with this semantic structure of the user utterance, the system utterance can be generated with a semantic structure having semantic areas of a verb "gada (to go)", a subject "appa (father)", a time "joomal (weekend)", and a place "nongjang (farm)".

Next, a sentence structure is generated for the semantic structure. In the above example, the basic sentence structure of the system utterance includes a verb stem "ga" as a higher node, and "appa", "joomal", and "nongjang" as lower nodes. Here, the higher node "ga" and lower nodes "appa" and "joomal" are classified as old information included in the user utterance, and "nongjang" is classified as new information. Since the speech act of the user utterance corresponds to wh-question (ASK_REF), retrieval information "nongjang", which is new information, is set as an emphasis part.

Next, morpheme information for the sentence structure is generated. In the above example, it is "Appaneun joomale N [nongjang]e N gaseyo (My father is going to a farm this weekend.)" and N is a first emphasis tag and indicates new information. At this time, by extending to a maximum semantic component that new information has, a focus range is set such that new information is extended to "nongjange".

Figure 4:
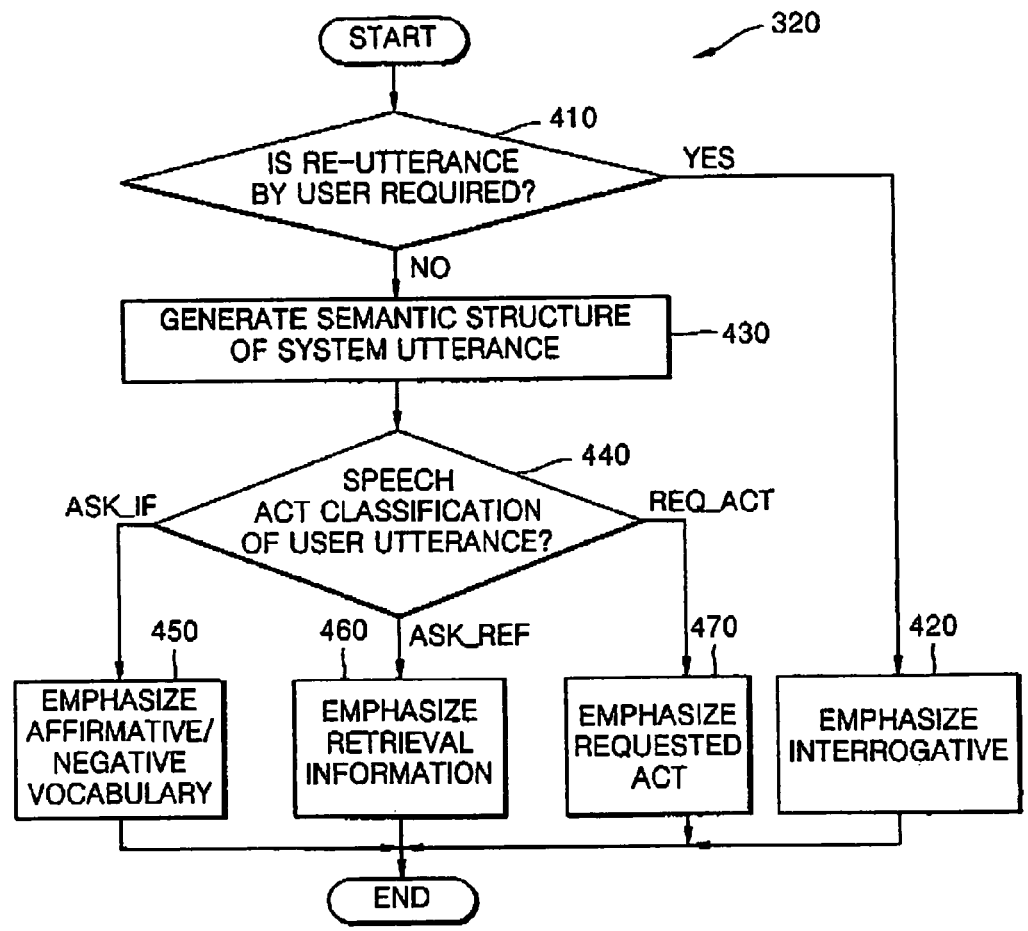
FIG. 4 is a flowchart for explaining operation of the emphasis part setting unit shown in FIG. 3.

FIG. 4 is a flowchart for explaining operation of the emphasis part setting unit 320 shown in FIG. 3.

Referring to FIGS. 1 and 4, in operation 410, a user utterance is input from the system speaking style determination unit 120, and the reliability of a recognized character string included in the user utterance is compared with a predetermined threshold. According to the comparison result, it is determined whether or not it is necessary for the speaker to re-utter the user utterance. If the reliability is less than the threshold, an interrogative in a predetermined system utterance generated in advance is set as an emphasis part and the user is asked to re-utter the sentence. If the determination result of operation 410 indicates that the reliability is greater than the threshold, in operation 430, the semantic structure of the user utterance is analyzed and the semantic structure of a system utterance corresponding to the analysis result is generated with reference to the dialog information database 110.

In operation 440, in order to set different discourse information, that is, a different emphasis part, according to the speech act of the user utterance, the speech act of the user utterance is classified. As examples of speech act classification, wh-question (ASK_REF), yes-no question (ASK_IF), and request acting (REQ_ACT) are shown, but speech act classes are not necessarily limited to these. When speech act classes include the above three types, according to the result of speech act classification in operation 440, any one of operations 450 through 470 is performed. If the speech act of the user utterance corresponds to yes-no question (ASK_IF), in operation 450, vocabulary corresponding to yes or no is determined as an emphasis part and a sentence structure is generated. If the speech act of the user utterance corresponds to wh-question (ASK_REF), in operation 460, retrieval information is determined as an emphasis part and a sentence structure is generated. If the speech act of the user utterance corresponds to request acting (REF_ACT), in operation 470, the requested act is determined as an emphasis part and a sentence structure is generated. Morpheme information is added to the sentence structure whose emphasis part is set as described above and a discourse information structure is generated.

Figure 5:
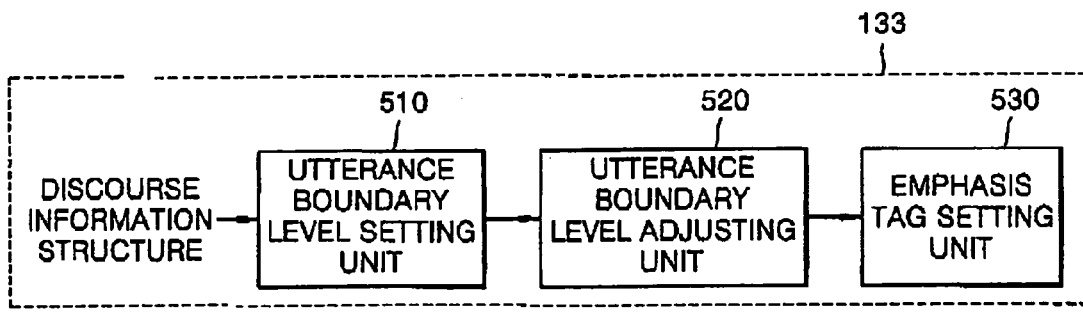
FIG. 5 is a detailed block diagram of the prosody information generation unit shown in FIG. 1.

FIG. 5 is a detailed block diagram of the prosody information generation unit 133 in FIG. 1. The prosody information generation unit 133 includes an utterance boundary level setting unit 510, an utterance boundary level adjusting unit 520, and an emphasis tag setting unit 530.

Referring to FIGS. 1 and 5, the utterance boundary level setting unit 510 sets an utterance boundary level in units of semantic units included in the discourse information structure provided by the discourse information generation unit 131. Here, the utterance boundary level indicates the length of a silent period between each semantic unit. For example, when silent periods are expressed by 0, 1, and 2, in order of length, '0' is assigned at the back of a semantic unit that is not new information, '1' is assigned in the front and at the back of a semantic unit that is new information, and '2' is assigned at the back of a semantic unit corresponding to the last part of a phrase or a clause. If a semantic unit that is old information is connected to a semantic unit that is new information, the semantic unit that is new information has priority. Accordingly, '1' is assigned in front of and at the back of the semantic unit that is new information.

The utterance boundary level adjusting unit 520 firstly adjusts an utterance boundary level, which is set in the utterance boundary level setting unit 510 based on a rule according to the closeness between semantic units. Here, the closeness is determined based on the syntax and case. For example, if the semantic unit is the nominative case and a noun, the level is adjusted upward by one level. If continuous first and second semantic units are of an identical syntax, the utterance boundary level of the second semantic unit is adjusted downward by one level. Also, a process for secondly adjusting an utterance boundary level that is firstly adjusted based on a rule, according to the number of syllables that can be spoken at a time, can be further included. These rules are statistically or experimentally obtained in advance and stored in a reference database disposed inside the utterance boundary level adjusting unit 520.

The emphasis tag setting unit 530 sets an emphasis tag indicating an accent, lengthening, a speech speed, the size of speech, the pitch of speech as well as the utterance boundary level adjusted in the utterance boundary level adjusting unit 520, and generates final prosody information. Here, the set contents of the emphasis tag are prepared in advance and stored in the emphasis tag setting unit 530, and if an emphasis part of the user utterance is determined in the emphasis part setting unit 320, an emphasis tag is set according to the characteristics of the emphasis part.

The operation of the prosody information generation unit 133 shown in FIG. 5 will now be explained in detail with reference to an example. In the above example of a system utterance, "Appaneun joomale nongjange gaseyo (My father is going to a farm this weekend.)", semantic units are "appaneun", "joomale", "nongjange", and "gaseyo". In the utterance boundary level setting unit 510, "appaneun" is set to '0', "joomale" is set to '1', "nongjange" is set to '1', and "gaseyo" is set to '2'. Then, in the utterance boundary level adjusting unit 520, firstly, "appaneun" is adjusted to '1', "joomale" is adjusted to '0', and then, secondly, "appaneun" is adjusted to '0'. Then, in the emphasis tag setting unit 530, a prosody structure, including an utterance boundary level, access, and utterance duration, is generated.

Figure 6:
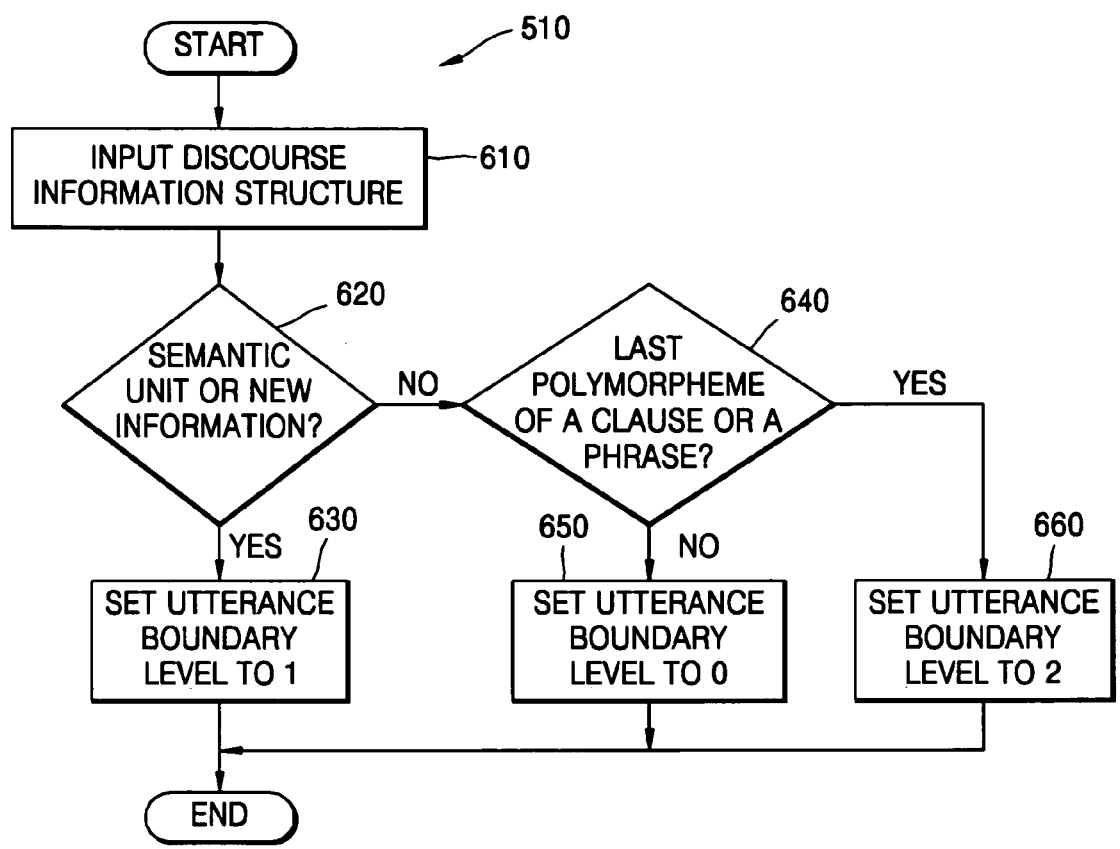
FIG. 6 is a flowchart for explaining operation of the utterance boundary level setting unit shown in FIG. 5.

FIG. 6 is a flowchart explaining operation of the utterance boundary level setting unit 510 shown in FIG. 5.

Referring to FIGS. 1 and 6, in operation 610, a discourse information structure from the discourse information generation unit 131 is input. Operations after this are performed in units of semantic units.

In operation 620, it is determined whether or not a semantic unit is new information. In operation 630, if it is determined in operation 620 that the semantic unit is new information, the utterance boundary level is set to '1'. Then the process ends after operation 630 is performed. In operation 640, if it is determined in operation 620 that the semantic unit is not new information, it is determined whether the semantic unit corresponds to the last polymorpheme of a clause or a phrase.

In operation 650, if the result of operation 640 indicates that the semantic unit does not correspond to the last polymorpheme of a clause or a phrase, the utterance boundary level is set to '0'. Then the process ends after operation 650 is performed. However, in operation 660, if the result of operation 640 indicates that the semantic unit corresponds to the last polymorpheme of a clause or a phrase, the utterance boundary level is set to '2'. Then the process ends after operation 660 is performed.

Figure 7:
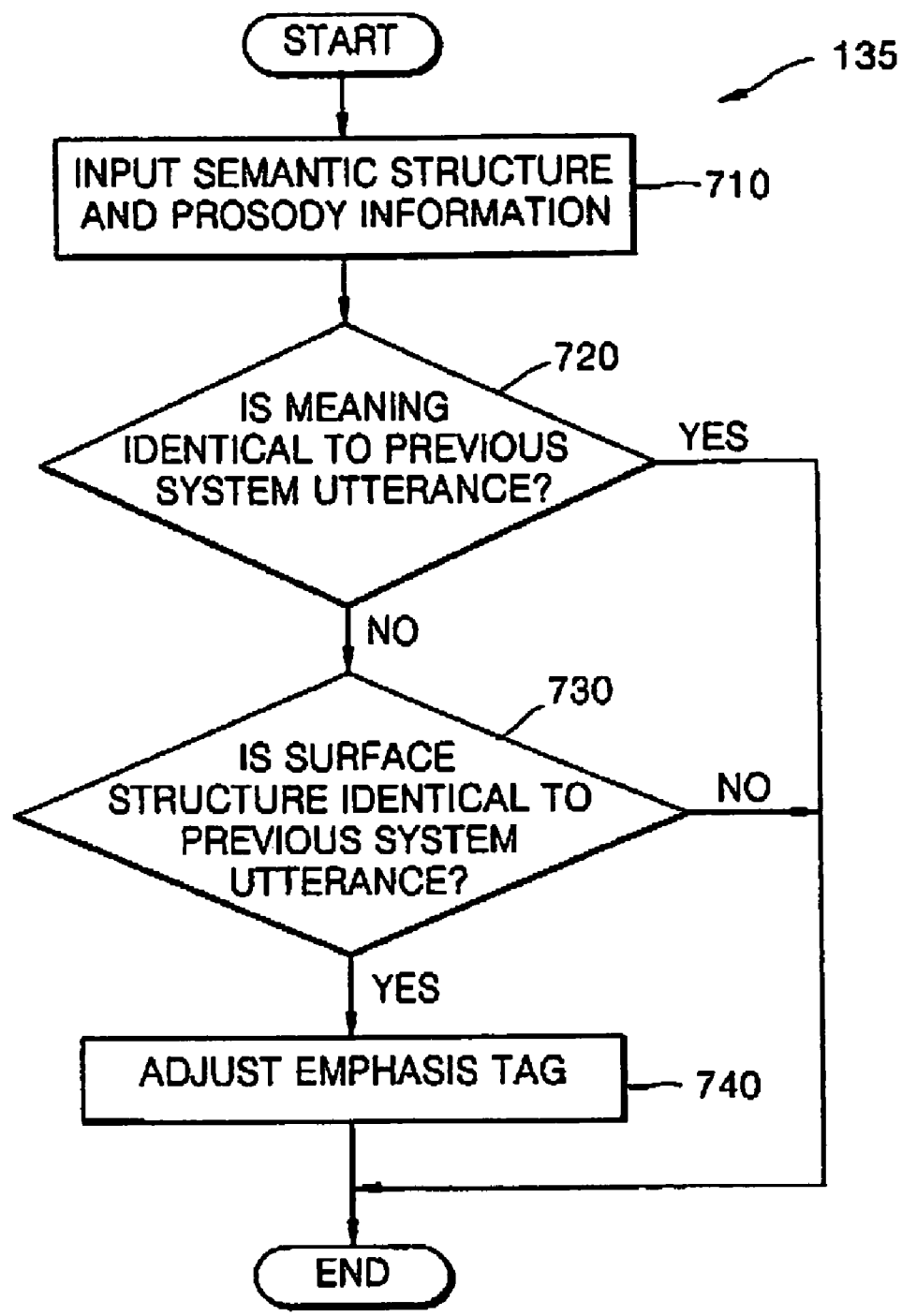
FIG. 7 is a flowchart for explaining operation of the repeated information application unit shown in FIG. 1.

FIG. 7 is a flowchart for explaining operation of the repeated information application unit 135 shown in FIG. 1.

Referring to FIGS. 1 and 7, in operation 710, a system utterance and prosody information from the prosody information generation unit 133 are input.

In operation 720, with reference to the dialog history stored in the dialog information database 110, it is determined whether or not the current system utterance has the same meaning as the previous system utterance.

If the result of operation 720 indicates that the current system utterance does not have the same meaning as the previous system utterance, it is determined that repeated information is not applied and the process ends.

In operation 730, if the result of operation 720 indicates that the current system utterance has the same meaning as the previous system utterance, it is determined whether or not the surface structure of the current system utterance is the same as the previous system utterance. If the result of operation 730 indicates that the surface structure of the current system utterance is not the same as the previous system utterance, it is determined that repeated information is not applied and the process ends.

In operation 740, if the result of operation 730 indicates that the surface structure of the current system utterance is the same as the previous system utterance, it is determined that repeated information is applied and the pitch range of the new information is extended to a predetermined extent and an emphasis is added. Operation 730 is optional and may be added or omitted at the user's discretion. If operation 730 is omitted, if the result of operation 720 indicates that the current system utterance has the same meaning as the previous system utterance, it is determined that repeated information is applied and an emphasis is added, and the pitch range of new information is extended to a predetermined extent.

The operation of the repeated information application unit 135 will now be explained in detail with reference to an example. It is assumed that the previous user utterance is "Volume jom nachuera (Turn the volume down)", a current user utterance is "Deo nachuebua (Turn it down more)", and the current system utterance to this is "Volumeol odange arero nairieoseoyo (I turned the volume down five levels)". At this time, if the current system utterance is compared with the previous system utterance, it can be seen that the sentences are formed with identical semantic units and the surface structures are identical: object+adverb+adverb+verb. Accordingly, by extending the pitch range of "odange", which is new information in the current system utterance, "odange" is made to be spoken louder than other semantic units.

Figure 8:
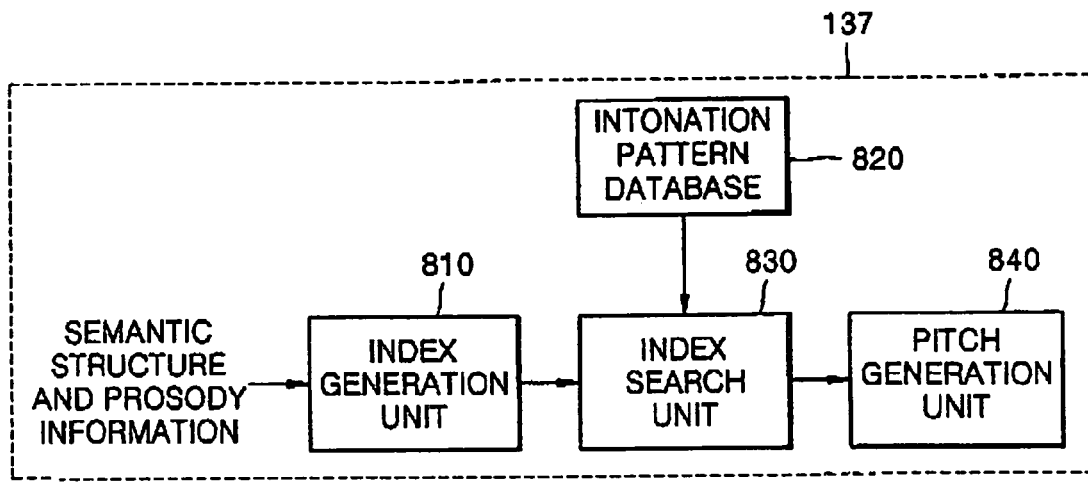
FIG. 8 is a detailed block diagram of the intonation pattern generation unit shown in FIG. 1.

FIG. 8 is a detailed block diagram of the intonation pattern generation unit 137 in FIG. 1. The intonation pattern generation unit 137 includes a characteristic extraction unit 810, an intonation pattern database 820, an index search unit 830, and a pitch generation unit 840.

Referring to FIGS. 1 and 8, the characteristic extraction unit 810 receives the semantic structure and prosody information of a system utterance as inputs, and extracts a plurality of characteristic values in units of semantic units.

The characteristics can include the number of syllables, semantic information, location information, and prosody boundary information, which can each be assigned a weight reflecting the characteristic's importance.

The intonation pattern database 820 generates a plurality of intonation patterns by using a plurality of characteristic values, and then adds an index and stores the results in a database. An example of the structure of the intonation pattern database 820 is shown in Table 1, and the included characteristics can be varied in a variety of ways.

TABLE 1

| Index | Number of Syllables | Phoneme informati | Semantic information | Position information | Pitch information | Utterance boundary | Prosody phrase ype | Pitch range |
|---|---|---|---|---|---|---|---|---|
| 1 | a1 | b1 | c1 | d1 | E1 | g1 | h1 | i1 |
| 2 | a2 | b2 | c2 | d2 | E2 | g2 | h2 | i2 |
| . | . | . | . | . | . | . | . | . |
| . | . | . | . | . | . | . | . | . |

In the above example of the system utterance, "Appaneun joomale nongjange gaseyo (My father is going to a farm this weekend)", if "appaneun" is taken as an example of a semantic unit, the number of syllables is 3. Phoneme information corresponds to the results of an analysis with respect to phonetic characteristics, such as a combination method of consonants and vowels, the articulation position of a phoneme, the shape of the lips, and the position of the tongue. Here, if the combination method of consonants and vowels is taken as an example, it is formed with monophthong-double consonant-monophthong-single consonant-monophthong-single consonant. Also, the semantic information is a subject, the position information is the start of the sentence, and the utterance boundary information corresponds to '0'. By comparing this series of characteristic information and characteristic information in the intonation pattern database 820, an index having the closest characteristic information is determined, and information set in the determined index, such as pitch information, the prosody phrase type, and the pitch range, becomes the intonation pattern. Here, the pitch information is information on an actual pitch value of a semantic unit, and the prosody phrase type is information on the pattern of pitch information, such as an up-down structure or a down-up structure of a semantic unit. The pitch range corresponds to information on an adjustment range which a series of pitch values can belong to.

The index search unit 830 searches the intonation pattern database 820 by using the characteristic values extracted in the characteristic extraction unit 810, and determines an intonation pattern corresponding to the index. The intonation pattern can include the pitch information, prosody phrase type, and pitch range as in the above example, but is not limited to these.

The pitch generation unit 840 sequentially generates the pitch of the system utterance in units of syllables and in units of phonemes, according to the intonation pattern of each semantic unit searched for in the index search unit 83, and then provides the results in units of final phonemes to the synthesis unit 150.

Figure 9:
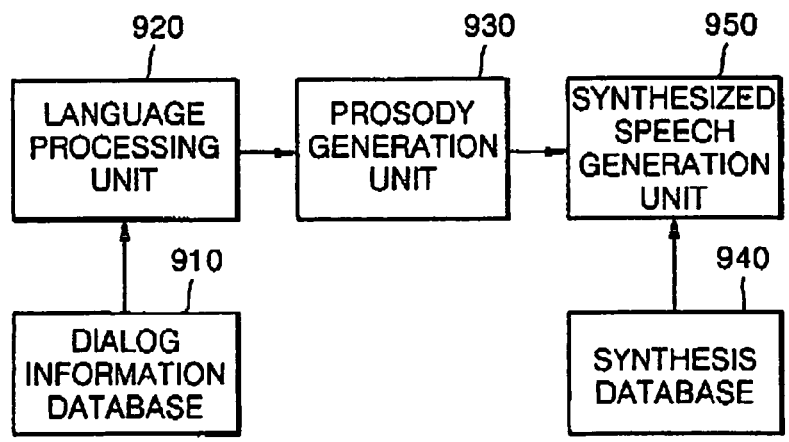
FIG. 9 is a block diagram showing the structure of a speech synthesis system according to another embodiment of the present invention.

FIG. 9 is a block diagram showing the structure of a speech synthesis system according to an embodiment of the present invention. The speech synthesis system includes a dialog information database 910, a language processing unit 920, a prosody generation unit 930, a synthesis database 940, and a synthesized speech generation unit 950.

Referring to FIGS. 1 and 9, the language processing unit 920 determines an utterance of the system in response to a user utterance, with reference to the dialog information database 910, analyzes the grammatical structure of the determined system utterance and provides a combination of appropriate synthesis units.

The prosody generation unit 930 determines whether the system utterance determined in the language processing unit 920 corresponds to read speech or dialog speech according to the speech act, intention, and domain of the system utterance. If the system utterance is determined to be read speech, an appropriate intonation and duration are extracted from a system utterance and a prosody is generated based on an ordinary method. If the system utterance is determined to be dialog speech, a prosody, including an emphasis part which is set according to discourse information between the user utterance and the system utterance, is generated.

The synthesized speech generation unit 950 applies the dialog or read speech prosody generated in the prosody generation unit 930, and by collecting synthesis units of the synthesis database 940, generates synthesized speech.

The above-described embodiments of the present invention can also be embodied as computer-readable codes stored on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices The computer-readable recording medium can also be distributed over network of coupled computer systems so that the computer readable code is stored and executed in a decentralized fashion.

According to the above-described embodiments of the present invention, if a system speaking style is dialog speech, when a system utterance corresponding to a user utterance is generated, discourse information is analyzed and applied to a prosody structure. Accordingly, even when system utterances have the same semantic structure and/or sentence structure, different prosodies matching the different intentions of a user can be generated. Consequently, the focus of a dialog or the intention of a speaker can be expressed such that the naturalness and clarity of synthesized dialog speech can be enhanced.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A dialog prosody structure generating method comprising:
generating discourse information based on a speech act of a user utterance for a semantic structure of a system utterance corresponding to the user utterance;
generating prosody information including an utterance boundary level indicating a duration of a silent period between each semantic unit for the discourse information of the semantic structure, wherein the utterance boundary level is adjusted based on closeness between semantic units, which is determined by syntax and case; and
generating an intonation pattern for the semantic structure of the system utterance based on the prosody information using by at least one computer system,
wherein the speech act provides a speech act classification of the user utterance, so that even when speech acts are identical, the generated intonation pattern varies according to the speech act classification of the user utterance.

2. The method of claim 1, further comprising adjusting an emphasis tag on repeated information when the semantic structure of a current system utterance is identical to that of a previous system utterance.

3. The method of claim 1, further comprising adjusting an emphasis tag on repeated information when the semantic structure and a surface structure of a current system utterance are identical to those of a previous system utterance.

4. The method of claim 1, wherein generating discourse information includes:
analyzing the semantic structure of the system utterance corresponding to the user utterance by referring to a dialog database, and generating semantic units;
selecting a semantic unit to be emphasized based on the speech act of the user utterance, and adding a first emphasis tag; and
generating a discourse information structure by combining the semantic unit to which the first emphasis tag is added with the remaining semantic units.

5. The method of claim 1, wherein generating prosody information includes:
setting a different utterance boundary level depending on whether a semantic unit of the system utterance is new information or old information;
adjusting the utterance boundary level according to closeness between semantic units;
readjusting the utterance boundary level based on the number of syllables capable of being spoken at one time; and
generating prosody information by adding the readjusted utterance boundary level, an accent, and a speech duration time, as a second emphasis tag, to each semantic unit.

6. A dialog prosody structure generating apparatus comprising:
a dialog information database which manages an entire dialog between a user and a system, and stores information and a dialog history required to proceed with the dialog based on speech acts and intention;
a discourse information generation unit which generates semantic units of a system utterance corresponding to a user utterance by referring to the dialog information database, and generates discourse information for each semantic unit based on a speech act of the user utterance;
a prosody information generation unit which generates prosody information including an utterance boundary level indicating a duration of a silent period between each semantic unit, for the discourse information of each semantic unit, wherein the utterance boundary level is adjusted based on closeness between semantic units, which is determined by syntax and case; and an intonation pattern generation unit which generates an intonation pattern for each semantic unit based on the prosody information using by at least one computer system, wherein the speech act provides a speech act classification of the user utterance, so that even when speech acts are identical, the generated intonation pattern varies according to the speech act classification of the user utterance.

7. The apparatus of claim 6, further comprising a repeated information application unit which, by referring to the dialog information database, adjusts an emphasis tag on repeated information when the semantic structure of a current system utterance is identical to that of a previous system utterance.

8. The apparatus of claim 6, further comprising a repeated information application unit which, by referring to the dialog information database, adjusts an emphasis tag on repeated information when the semantic structure and a surface structure of a current system utterance are identical to those of a previous system utterance.

9. A speech synthesis method comprising:
determining a system speaking style based on a user utterance;
generating dialog prosody information including an utterance boundary level indicating a duration of a silent period between each semantic unit by reflecting discourse information between a user and a system when the system speaking style is determined as dialog speech, wherein the utterance boundary level is adjusted based on closeness between semantic units, which is determined by syntax and case; and
synthesizing a system utterance based on the generated dialog prosody information using by at least one computer system,
wherein the speech act provides a speech act classification of the user utterance, so that even when speech acts are identical, the synthesized system utterance varies according to the speech act classification of the user utterance.

10. The method of claim 9, further comprising synthesizing a system utterance based on prosody information generated according to a rule when the system speaking style is determined as read speech.

11. The method of claim 9, wherein determining the system speaking style includes:
determining a speech act and intention associated with the user utterance by referring to a dialog information database; and
determining the system speaking style as one of read speech and dialog speech according to the speech act and intention associated with the user utterance.

12. The method of claim 9, wherein generating dialog prosody information includes:
generating discourse information for the semantic structure of the system utterance based on the speech act of the user utterance;
generating prosody information, including an utterance boundary level, for the discourse information of the semantic structure; and
generating an intonation pattern for the semantic structure of the system utterance based on the prosody information.

13. The method of claim 12, wherein generating dialog prosody information includes adjusting an emphasis tag on repeated information when the semantic structure of a current system utterance is identical to that of a previous system utterance.

14. The method of claim 12, wherein generating dialog prosody information includes adjusting an emphasis tag on repeated information when the semantic structure and a surface structure of a current system utterance are identical to those of a previous system utterance.

15. The method of claim 12, wherein generating discourse information includes:
generating semantic units by referring to a dialog information database and analyzing the semantic structure of the system utterance corresponding to the user utterance;
selecting a semantic unit to be emphasized based on the speech act of the user utterance, and adding a first emphasis tag to the semantic unit; and
generating a discourse information structure by combining the semantic unit to which the first emphasis tag is added with the remaining semantic units.

16. The method of claim 15, wherein adding the fist emphasis tag comprises:
setting a different utterance boundary level depending on whether a semantic unit of the system utterance is new information or old information;
adjusting the utterance boundary level according to a closeness between the semantic units;
readjusting the utterance boundary level based on the number of syllables capable of being spoken at one time; and
generating prosody information by adding the adjusted utterance boundary level, an accent, and a speech duration time, as a second emphasis tag, to each semantic unit.

17. A speech synthesis system comprising:
a dialog information database which manages an entire dialog between a user and a system, and stores information and a dialog history required to proceed with the dialog based on speech acts and intention;
a system speaking style determination unit which, by referring to the dialog information database, determines a system speaking style based on a user utterance;
a dialog prosody generation unit which, when the system speaking style is determined as dialog speech, generates dialog prosody information including an utterance boundary level indicating a duration of a silent period between each semantic unit by referring to the dialog information database and reflecting discourse information between a user and the system, wherein the utterance boundary level is adjusted based on closeness between semantic units, which is determined by syntax and case; and
a synthesis unit which synthesizes a system utterance based on the generated dialog prosody information using by at least one computer system,
wherein the speech act provides a speech act classification of the user utterance, so that even when speech acts are identical, the synthesized system utterance varies according to the speech act classification of the user utterance.

18. The system of claim 17, further comprising a system utterance generation unit which, when the system speaking style is determined as read speech, generates a system utterance corresponding to the user utterance by referring to the dialog information database and provides the generated system utterance to the synthesis unit.

19. A non-transitory computer-readable recording medium having embodied thereon a computer program used by at least one computer system for executing a dialog prosody structure generating method, the method comprising:

generating discourse information based on a speech act of a user utterance for a semantic structure of a system utterance corresponding to the user utterance;

generating prosody information including an utterance boundary level indicating a duration of a silent period between each semantic unit for the discourse information of the semantic structure, wherein the utterance boundary level is adjusted based on closeness between semantic units, which is determined by syntax and case; and generating an intonation pattern for the semantic structure of a system utterance based on the prosody information, wherein the speech act provides a speech act classification of the user utterance, so that even when speech acts are identical, the generated intonation pattern varies according to the speech act classification of the user utterance.

20. A non-transitory computer-readable recording medium having embodied thereon a computer program used by at least one computer system for executing a speech synthesis method, the method comprising:

determining a system speaking style based on a user utterance;

generating dialog prosody information including an utterance boundary level indicating a duration of a silent period between each semantic unit by reflecting discourse information between a user and a system when the system speaking style is determined as dialog speech, wherein the utterance boundary level is adjusted based on closeness between semantic units, which is determined by syntax and case; and synthesizing a system utterance based on the generated dialog prosody information, wherein the speech act provides a speech act classification of the user utterance, so that even when speech acts are identical, the synthesized system utterance varies according to the speech act classification of the user utterance.

21. A prosody structure generation apparatus comprising:

a dialog information database which manages an entire dialog between a user and a system, and stores information and a dialog history required for the dialog to proceed based on a speech acts and intention;

a system speaking style determination unit which determines a speech act and intention by analyzing a user utterance obtained through a speech recognition process with reference to the dialog information database, and determines the system speaking style as either read speech or dialog speech according to the determined speech act and intention associated with the user utterance; and a dialog prosody generation unit including a discourse information generation unit, a prosody information generation unit, and an intonation pattern generation unit, wherein the discourse information generation unit receives a user utterance from the system speaking style determination unit and generates a discourse information structure in which a different emphasis part is set according to whether the speech act and included semantic unit of a system utterance corresponding to whether the user utterance is new information or old information, wherein the prosody information generation unit receives discourse information structure from the discourse information generation unit, and a semantic structure, a sentence structure, and a morpheme structure of a system utterance, and generates prosody information in which an emphasis tag including an utterance boundary level, accent, and utterance duration is set on the basis of the types of semantic words, a closeness between polymorphemes, and a number of syllables that can be spoken at a time, wherein the utterance boundary level is adjusted based on closeness between semantic units, which is determined by syntax and case, and wherein the intonation pattern generation unit receives inputs of the semantic structure of a system utterance including prosody information, extracts a plurality of characteristics in each semantic unit and compares the plurality of characteristics with the characteristics of each semantic unit of an intonation pattern database with contents of characteristics of each semantic unit and their index, searches for a semantic unit having closest characteristics, and generates an intonation pattern according to a result of the search using by at least one computer system, wherein the speech act provides a speech act classification of the user utterance, so that even when speech acts are identical, the generated intonation pattern varies according to the speech act classification of the user utterance.

22. The apparatus of claim 21, wherein the dialog information database expresses system utterances corresponding to user utterances that are input, according to the speech act and intention, and stores the system utterances as elements of a database.

23. The apparatus of claim 21, wherein the system speaking style determination unit sets a criterion to determine a system speaking style, by determining the criterion statistically or experimentally in advance, corresponding to speech act and intention.

24. The apparatus of claim 21, wherein the a dialog prosody generation unit includes a repeated information application unit which adds, by referring to the dialog history stored in the dialog information database, an extended pitch range to the emphasis tag or adjusts an already set accent or utterance duration, depending on whether a current system utterance has the same meaning as the previous system utterance, and provides finally generated prosody information to the intonation pattern generation unit.

25. The method of claim 1, wherein the speech act classification of the user utterance includes one of an interrogatory, an answer to an interrogatory, a statement to inform, a greeting, and a request.

* * * * *

UNITED STATES PATENT AND TRADEMARK OFFICE
CERTIFICATE OF CORRECTION

PATENT NO. : 8,234,118 B2
APPLICATION NO. : 11/132195
DATED : July 31, 2012
INVENTOR(S) : Kyoungnan Pyo et al.

It is certified that error appears in the above-identified patent and that said Letters Patent is hereby corrected as shown below:

Column 14, Line 21, In Claim 16, delete "fist" and insert -- first --, therefor.

Signed and Sealed this
Twenty-seventh Day of November, 2012

David J. Kappos
*Director of the United States Patent and Trademark Office*